United States Patent Office 3,332,570
Patented July 25, 1967

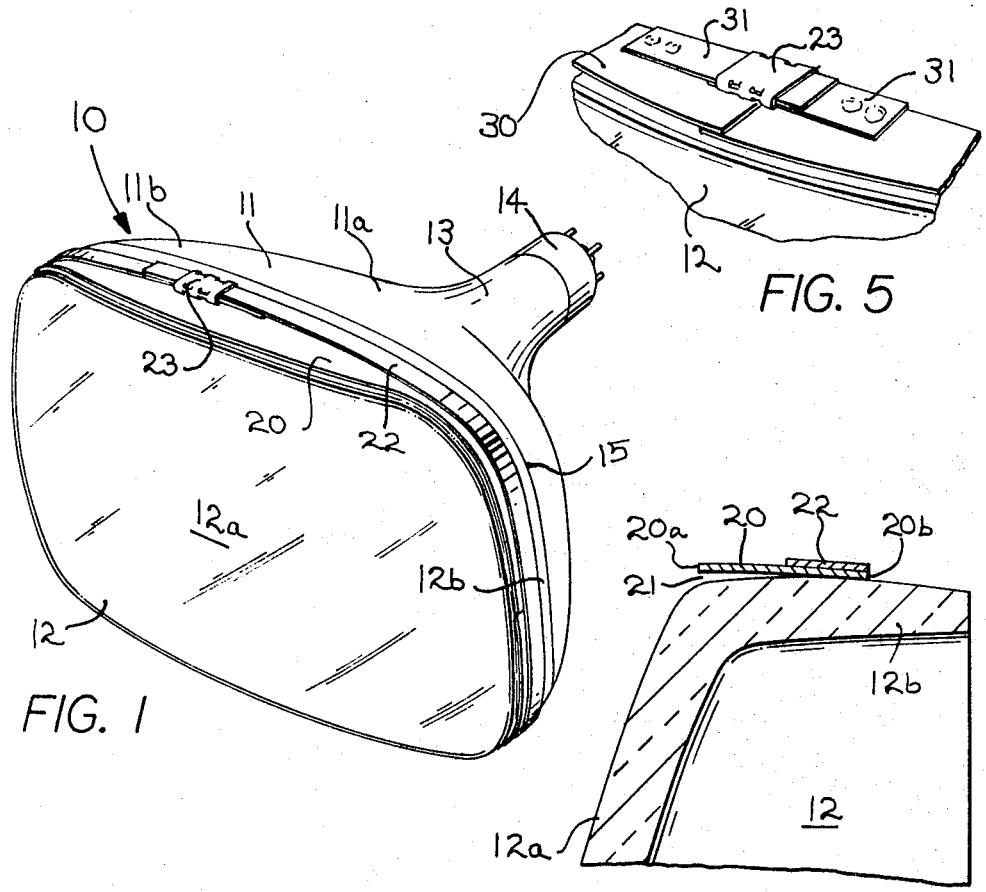
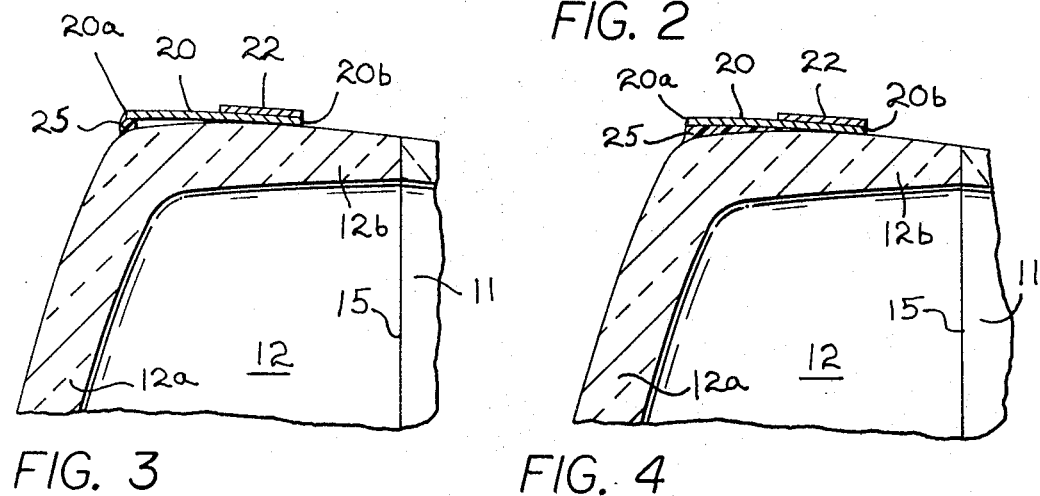
INVENTOR.
DARYL E. POWELL &
BURTON W. SPEAR
BY
ATTORNEYS

3,332,570
CATHODE-RAY AND OTHER VACUUMIZED TUBES RESISTANT TO FRACTURE AND CAPABLE OF CONTROLLED DEVACUATION
Daryl E. Powell, Maumee, and Burton W. Spear, Toledo, Ohio, assignors to Owens-Illinois, Inc., a corporation of Ohio
Filed June 10, 1965, Ser. No. 462,879
16 Claims. (Cl. 220—2.1)

The present invention primarily relates to television and, more particularly, to the control and prevention of fracture and implosive-explosive effects in sealed and vacuumized cathode-ray image tubes for television reception. The invention more specifically relates to improved types of direct-viewing cathode-ray image tubes as well as other vacuumized tubes having glass envelopes and methods of fabricating such tubes to eliminate breakage and to control devacuation thereof upon accidental or spontaneous breakage either in processing, shipping, installation, or while in service.

In the manufacture of television picture tubes having essentially all-glass envelopes, each tube is evacuated to a high degree of vacuum with the resultant effect of creating high external pressures over extensive surface areas of the tube. Relative dimensions of these vacuumized tubes are such that substantial surface pressures are exerted on the glass sidewalls and particularly on the viewing and sealed portions. In a vacuumized 27 diagonal inch rectangular picture tube, the viewing area alone presents a surface area of about 400 square inches so that atmospheric loading places a total pressure of approximately 5800 pounds on the tube viewing portion. Such pressures cause a vacuumized tube to be highly subject to implosive-explosive effects upon fracture or breakage of the envelope and sudden uncontrolled devacuation thereof. Therefore, the tube envelope and its various sealed areas must be designed to withstand such high pressures with a proper degree of safety without damage or breakage during processing, shipment and installation, as well as during long-term service.

Our prior copending application, Ser. No. 225,448, filed Sept. 24, 1962, entitled "Cathode-Ray and Other Vacuumized Tubes Resistant to Fracture and Capable of Controlled Devacuation," now Patent No. 3,220,593, discloses a cathode-ray tube construction which is integrally safe for direct viewing and does not require a separate implosion panel as did cathode-ray tubes utilized prior to such invention. The cathode-ray tube and method for fabricating disclosed in our prior application, while exceptionally satisfactory for the intended purpose as evidenced by its widespread commercial acceptance, and while substantially more economical than cathode-ray tubes formed prior to that time, suffers from deficiencies which it is an object of the present invention to eliminate.

In the cathode-ray tube system as disclosed in our prior application, the picture tube envelope was made resistant to implosive and explosive effects on breakage by means which included the application of a high tensile strength annular band about the periphery of the face plate sidewall portion with the band being adhered to such sidewall portion by means of a continuous annular layer of synthetic resin. In accordance with that invention, the reinforcing elements can be applied to exterior non-viewing surfaces of the tube envelope either after the tube was fully fabricated or prior to subjecting the envelope or bulb to a tube-fabricating process. In the former case the tube is fully completed and assembled with all its required internal and external electrical working components properly installed in operative alignment and is subjected to bake-out temperatures and evacuation prior to applying the reinforcing elements. In the latter case, the tube envelope consisting only of a so-called glass bulb having none of the internal electrical working components installed is subjected to the application of the required elements with ambient conditions existing both internally and externally thereof. The bulb, after being fabricated into a form where its devacuation is controllable, is then subjected to a tube fabricating process. However, in this case the components of the present implosion-resistant system must be capable of withstanding required bake-out cycling temperatures and pressures of the tube-making process. The commercialization of our prior invention has resulted in nearly all tube manufacturers applying all of the reinforcing elements after the tube is fully fabricated. This is due primarily to the fact that most resins are not capable of withstanding the above-referenced bake-out cycling temperatures.

Under the present invention, it is possible to apply the main reinforcing element, namely one or more annular bands, prior to the tube fabricating bake-out cycle and the resin subsequent to such bake-out cycle.

Under the teachings of our prior application, it was necessary to apply the resin either to the face plate flange or sidewall region or, preferably to the band itself and then mount the band around the periphery of such flange. Difficulty was encountered in that resin was squeezed out from between the band and the flange when the band was snugly secured thereto. This created a messy appearance on the face plate and required an expensive clean-up operation. Under the present invention, it is possible to fabricate an integrally-safe direct viewing cathode-ray tube envelope in which reinforcing means are applied with little or no subsequent clean-up operation being required.

Accordingly, it is an object of the present invention to provide a direct viewing cathode-ray television picture tube which is resistant to fracture and sudden devacuation without serious fragmentation and yet which is more economical than heretofore possible.

It is a further object of the present invention to provide a reinforced glass vacuum tube envelope in which the resin material for bonding the reinforcing band to the face plate may be applied after the reinforcing band has been placed on such face plate.

It is an additional object of the present invention to provide a method for securing reinforcing elements to a cathode-ray tube envelope face plate which does not require a subsequent clean-up operation.

It is an additional object of the present invention to provide as an intermediate article of manufacture a face plate for a cathode-ray tube envelope in which a portion of the reinforcing means may, if desired, be secured by the glass envelope manufacurer and the remainder secured by the tube fabricator.

A further object of the present invention is to provide a face plate having heat-resistant reinforcing means extending over non-viewing surfaces adjacent the viewing area, said reinforcing means being capable of withstanding thermal cycling during the tube-making process and facilitating the addition of heat-destructible components to the completed tube in supplemental operations.

A still further object of this invention is to provide a method of fabricating an electron discharge tube envelope having integral reinforcing components surrounding peripheral sidewalls of essentially maximum cross-sectional dimensions of the envelope, said reinforcing components being capable of withstanding thermal cycling during the tube-making processes and facilitating the addition of heat-destructible components to the completed tube in supplemental operations.

The specific nature of this invention as well as other objects and advantages thereof will become apparent to those skilled in the art from the following detailed description taken in conjunction with the annexed sheet of drawings on which, by way of preferred example only, are illustrated the preferred embodiments of this invention.

In the accompanying drawings:

FIGURE 1 is a perspective view of a cathode-ray television picture tube fabricated in accordance with the present invention.

FIGURE 2 is an enlarged fragmentary view, partly in section, of the face plate portion only of a cathode-ray tube envelope after application of the heat-resistant band portion of the reinforcing element thereto but before the application of the heat-destructible resin portion thereto.

FIGURE 3 is an enlarged fragmentary view of a cathode-ray tube illustrating the positioning of the resin comprising the heat-destructible reinforcing material during the initial stage of its application to the gap beween the band and the face plate flange.

FIGURE 4 is a view similar to FIGURE 3 of a completed cathode-ray tube upon completion of flowing the resin into position.

FIGURE 5 is a fragmentary view illustrating a modified embodiment wherein a single annular band functions both as a rim band and a tension band.

The present invention is described hereinbelow as specifically applied to the manufacture of a television cathode-ray picture tube. However, it will be apparent to those skilled in the art that the invention is equally applicable to the manufacture of many different types of evacuated tube envelopes, particularly all-glass envelopes having substantial dimensions which are subject to implosion and explosion on sudden devacuation.

The term "devacuation" as used herein is intended to mean the converse of "evacuation" as in the case where a vacuumized vessel experiences an internal pressure change toward atmospheric pressure upon loss of vacuum. The rate of change may occur rapidly or over an extended period of time wherein the vacuated space interiorly of the envelope returns to atmospheric pressure.

The present invention provides an impact-resistant and implosion-proof system in which a portion of the reinforcing means, namely the annular band, may be applied to the bulb at any stage of manufacture with only the resin portion of the reinforcing means being applied after assembly of the tube. As used herein, the term "bulb" is applicable to the tube envelope per se, while the term "tube" refers to the envelope hermetically sealed in evacuated condition with its additional electrical and image producing components properly installed in operative arrangement.

Briefly stated, the invention involves the application of a high-tensile strength contoured annular band which is snugly mounted around a perimetrical region of the tube face plate surrounding its non-viewing exterior surfaces of substantially maximum cross-sectional dimensions. As desired, the annular band may be applied to the face plate before the sealing of the face plate to the funnel or body portion of the envelope or, in the alternative, may be applied to such perimetrical region after the face plate has been joined to the funnel or body portion, or even after fabrication of the tube with its attendant bake-out cycles. In any event, the band is secured to the peripheral sidewall region or flange of the face plate so that leading annular edge thereof, i.e. that edge nearest to the face plate viewing panel, is spaced from such flange and cooperates therewith to define an annular gap or plenum capable of receiving a bead of resin. The trailing annular edge of such band, i.e. that edge furthest removed from said viewing panel, is snugly engaged to such flange or sidewall. If desired, a second annular band may be placed around the peripheral sidewall region and at least partially overlapping a rearward or trailing annular portion of the first applied band. Preferably, these annular bands are heat-resistant and capable of withstanding conventional thermal bake-out and evacuation cycles of cathode-ray tube-making processes.

After the tube is fully fabricated into final form, an annular layer of adhesive material such as synthetic resin is introduced into the annular gap between the forward portion of the annular band and the peripheral sidewall region to provide a continuous perimetrical bonding layer. A single annular band having proper physical characteristics such as thin-walled, high-tensile strength metal can be employed to perform functions of the several individual bands as desired or required.

Referring now to the drawings, there is provided a glass cathode-ray picture tube envelope generally designated by the numeral 10 comprising a funnel member 11, face plate member 12 and neck tubulation 13 which are joined to form a unitary hollow glass article. The terminating end of the neck 13 has mounted thereon gun socket 14 connected to one or more electron beam emitting guns. Funnel member 11 is usually frusto-conical or frusto-pyramidal in shape with its small end 11a sealed to the neck 13 and its large end 11b sealed to the face plate 12. Electromagnetic beam deflecting coils (not shown) are normally mounted in the yoke area where the neck 13 and funnel small end 11a are joined to provide proper scanning of the tube screen.

The face plate 12 consists of a concavo-convex viewing portion 12a bounded by a depending annular sidewall panel or flange 12b. Face plate flange 12b and the large end 11b of the funnel member both terminate in annular sealing surfaces of complemental contour. The sealing surfaces are joined at seal line 15 either by direct fusion of the glass or by an interposed annular layer of low melting glass sealing composition which is selected as being compatible with the thermal and physical characteristics of the parent glass parts. The basic shape of the envelope viewing area may be either circular or rectangular in plan as conventionally known in the art with the sealing surfaces being substantially planar for forming a vacuum-tight durable joint.

Secured to the face plate flange 12b is a peripheral rim band 20. The rim band may be comprised of either one endless band which may be sweated onto the exterior surface of the flange 12b, or a pair of symmetrical U-shaped half sections, or a single strap contoured generally to the plan shape of the envelope. The rim band 20 has a leading annular edge 20a disposed adjacent the viewing portion 12a of face plate 12 and a trailing annular edge 20b extending therefrom. The interior surface of the rim band 20 toward the trailing annular edge 20b is complementally contoured to snugly engage the flange 12b in surface-to-surface contact. In contrast, the leading annular edge 20a and the portion of the rim band adjacent thereto is spaced from the peripheral sidewall of the flange 12b and cooperates therewith to define an annular gap 21. The gap 21 is normally wedge-shaped in cross section and extends from its widest point at the leading edge 20a toward the trailing edge 20b. The leading edge 20a is contoured to follow the contour of the face plate at the vicinity of non-viewing juncture between the flange 12b and viewing area 12a and provide a substantially uniform spacing therefrom whether the viewing panel be rectangular or circular in plan.

The rim band which closely contours to the exterior surface of the transitional area between panel and rim has a uniform cross section when applied to a circular face plate; however, it normally has a non-uniform cross section to conform to the periphery of a concavo-convex rectangular face plate. A preferred form of metallic rim band consists of a pair of press-formed U-shaped similar plates which are wider on the long axis side with an arcuate forward edge and essentially uniform width along their short axis sides. The plates are formed to telescopically engage with each other on opposing short axis sides of the rectangular face plate with the uniform annular front-opening space being formed when the plates are seated in contact with rearward exterior surfaces of the face plate flange.

In the embodiment illustrated in FIGURES 1 through 4, a tension band 22 is positioned over the rim band 20 and drawn to a tension on the order of 1200 to 1600 pounds. The ends of the tension band 22 are passed through a connecting clip 23 which after the band is tensioned is then crimped to form a permanent connection of the band ends. If desired, other means such as welding may be used for connecting the ends of the band 22. By way of illustration only and without imparting any limitation, the tension band may be formed of high tensile strap steel on the order of .015 to .035 inch thick and .5 to .75 inch wide while the rim band may be aluminized or zinc coated steel on the same order of thickness.

As previously stated, the rim and tension bands may be applied to the face plate flange 12b during any desired stage of fabrication of the cathode-ray tube subsequent to forming of the face plate 12. Thus, as illustrated in FIGURE 2, the rim and tension bands may be applied to the flange 12b of the face plate only prior to the joining of the face plate 12 to the funnel portion 11. It should be understood, however, that the rim and tension bands may be applied to the face plate flange 12b after the face plate 12 is joined to the funnel portion 11 to form the cathode-ray tube envelope. Similarly, if desired, it may be applied after all of the electronic components have been inserted to form the television picture tube.

If desired, and as illustrated in FIGURE 5, a single band 30 may be utilized to function as both the rim and the tension band. Under this embodiment, the band 30 has a tab 31 welded or otherwise secured to each end. The tabs 31 are overlapped and drawn to the desired tension. The clip 23 or other connecting means is then secured thereto.

As illustrated in FIGURE 3, an annular strip or ring of resin material 25 is applied in the annular gap 21 adjacent leading annular edge 20a. The strip of resin material 25 is frequently of a type not capable of withstanding the high bake-out temperatures required during the tube fabricating process; accordingly, such bead will normally be applied as one of the final steps subsequent to the bake-out operation. However, it is within the contemplation of the present invention that where the resin is formed of a non-heat destructible material, it could be applied prior to such bake-out cyclic and still permit the invention to serve the very desirable function of reinforcing without the attendant clean-up operations heretofore required.

Various types of epoxy resins or polyesters may be used to form the bead of resin material 25 which is flowed into the gap 21 to adhere the rim band 20 to the flange 12b. Examples of such epoxy resins include Union Carbide Epoxy No. EBLA 2875, the resin being a thixotropic paste having a relatively high viscosity when previously mixed with two parts Union Carbide Hardener No. ZBLA 0655 per one part resin. The subject resin is a viscous resin system manufactured by Union Carbide Company primarily for sealing glass-to-metal surfaces. This resin is comprised of liquid epoxide resin which can be cross-linked by a liquid hardener into a thermoset, tough, rupture-resistant solid having excellent dimensional stability and strength. The prescribed resin system has an elongation at rupture of 30 percent, a tensile strength of 1300 p.s.i. and will cure at room temperature in ½ to 1 hour. The reacted resin system forms a stable, firmly adhesive permanent bond between glass and metal surfaces. Other properties of this resin are described in a Union Carbide Plastic bulletin dated Aug. 6, 1962, entitled "Rim Band Bonding System." Another epoxy resin which is particularly well suited for this purpose is Union Carbide Epoxy No. EBLB 7652 which is also a thixotropic paste having a relatively high viscosity when mixed two parts Union Carbide Hardener No. ZBLA 8653 per three parts resin. This resin system has an elongation at rupture of 1 percent and will cure at room temperature in ½ to one hour or at 200° F. in ten minutes.

As heretofore noted, the annular strip or ring of resin material 25 is normally applied to the gap 21 after the electrical components have been assembled in the cathode-ray tube envelope to form the television receiver and the attendant bake-out cycle has been completed. Preferably, the resin material is inserted into the annular gap to fill the same with the tube mounted vertically face up in such manner as to place the gap in a horizontal plane. The surface-to-surface contact of the rearward portion of the rim band serves to seal the bottom of the space when the tube is face up to facilitate introduction of the initially flowable bonding material without leakage beyond the limits of the rim band. After application of the resin material, the tube is placed in an oven and heated to approximately 200° F. for ten minutes to flow it completely into the gap 21 and to cure it. The neatness with which the resin can be applied by virtue of this construction completely eliminates the necessity of any subsequent clean-up operation requiring the removal of excess resin material. This is in contrast to the previously utilized methods wherein resin material was applied prior to the application of the band either to the band or the face plate flange which required extensive clean-up operations.

It can be seen from the foregoing that the present invention provides a new and novel cathode-ray tube envelope and method for fabricating the same which is equally safe as the direct viewing systems heretofore proposed but which is much more economical in that it eliminates one complete operation, namely the clean-up operation, and visibly indicates the adhesion of the band to the tube envelope. Additionally, it relieves the tube fabricators of the necessity of applying the rim and tension band portions of the reinforcing elements at a particular and limited time during fabrication of the tube as, under the present invention, these elements may be applied at any time during manufacture, by the glass manufacturer following formation of the face plate 12 or the entire envelope, for example, or by the tube maker prior to the tube-making process. Whether one or two annular bands be employed, they can be mounted entirely forwardly and terminating short of the face plate to permit either direct glass-to-glass sealing by fusion or solder glass sealing without adversely affecting these reinforcing elements.

Numerous modifications may be resorted to within the spirit and scope of the appended claims.

We claim:

1. An essentially all-glass cathode-ray tube envelope resistant to fracture comprising a substantially funnel-shaped hollow body portion having a viewing portion enclosing its larger forward end and a neck tubulation projecting from its smaller rearward end, and reinforcinng means exteriorly surrounding the peripheral sidewall region of said viewing portion having sufficient yield strength to prevent fracture propagation through the sidewall therebeneath on breakage, said reinforcing means including at least one annular band substantially planar in transverse cross-section having its forwardmost leading edge disposed adjacent and following the non-viewing peripheral contour of said viewing portion and its trailing edge extending rearwardly therefrom, said annular band in the area of said leading edge being spaced from said sidewall and cooperating therewith to define an annular gap and in the area of said trailing edge being complementally contoured to reside in interfacial contact with the exterior surface of said sidewall.

2. An essentially all-glass cathode-ray tube envelope resistant to fracture comprising a substantially funnel-shaped hollow body portion having a viewing portion enclosing its larger forward end and a neck tubulation projecting from its smaller rearward end, and reinforcing means exteriorly surrounding the peripheral sidewall region of said viewing portion having sufficient yield strength to prevent fracture propagation through the sidewall therebeneath on breakage, said reinforcing means including at least one annular band substantially planar in transverse cross-section having its forwardmost leading edge disposed adjacent and following the non-viewing peripheral contour of said viewing portion and its trailing edge extending rearwardly therefrom, said annular band in the area of said leading edge being spaced from said sidewall and cooperating therewith to define a relatively uniform annular gap and in the area of said trailing edge being complementally contoured to reside in interfacial contact with the exterior surface of said sidewall, and bonding material disposed within said annular gap to adhere said band to said sidewall.

3. A hollow glass article comprising a light-transmitting panel portion and an annular flange depending therefrom, an annular band encircling said flange and surrounding the non-viewing periphery of said panel portion, said annular band being essentially planar in transverse cross-section having its leading edge disposed adjacent the periphery of said panel and its junction with said flange and its trailing edge extending toward the extremity of said flange, said band in the region of its leading edge being spaced from said panel periphery and flange and cooperating therewith to define an annular gap in the region of said trailing annular edge being complementally contoured to reside in interfacial contact with the exterior surface of said flange.

4. An essentially all-glass cathode-ray tube envelope resistant to fracture comprising a substantially funnel-shaped hollow body portion having a viewing portion enclosing its larger forward end and a neck tubulation projecting from its smaller rearward end, and reinforcing means exteriorly surrounding the peripheral sidewall region of said viewing portion having sufficient yield strength to prevent fracture propagation through the sidewall therebeneath on breakage, said reinforcing means including at least one annular band substantially planar in transverse cross-section having its leading forwardmost edge disposed in the vicinity of and parallel to the non-viewing juncture of said sidewall region with said viewing portion and its trailing edge extending rearwardly therefrom, said annular band in the region of said leading annular edge being spaced from said sidewall and cooperating therewith to define an annular gap and in the area of said trailing edge being complementally contoured to reside in interfacial contact with the exterior surface of said sidewall.

5. An essentially all-glass cathode-ray tube envelope resistant to fracture comprising a substantially funnel-shaped hollow body portion having a viewing portion enclosing its larger forward end and a neck tubulation projecting from its smaller rearward end, and reinforcing means exteriorly surrounding the peripheral sidewall region of said viewing portion having sufficient yield strength to prevent fracture propagation through the sidewall therebeneath on breakage, said reinforcing means including at least one annular band substantially planar in transverse cross-section having its leading forwardmost edge disposed in the vicinity of and parallel to the non-viewing juncture of said sidewall region with said viewing portion and its trailing edge extending rearwardly therefrom, said annular band in the region of said leading annular edge being spaced from said sidewall and cooperating therewith to define an annular gap and in the area of said trailing edge being complementally contoured to reside in interfacial contact with the exterior surface of said sidewall and bonding material disposed within said annular gap to adhere said band and said sidewall into an integral structure.

6. A face plate for a cathode-ray tube envelope comprising a viewing panel, an integrally formed annular flange extending rearwardly therefrom, and a reinforcing means of high tensile strength material encircling said flange, said reinforcing means including at least one annular band substantially planar in transverse cross-section having a leading edge disposed in the vicinity of and parallel to the non-viewing juncture of the viewing panel and the flange and a trailing annular edge extending rearwardly therefrom, said reinforcing band in the region of said leading annular edge being spaced from said flange and cooperating therewith to define an annular gap and in the region of said trailing edge being complementally contoured to reside in interfacial contact with the exterior surface of said flange.

7. The article as defined in claim 6 wherein said one annular band is maintained in permanent tension.

8. The article as defined in claim 6 wherein a second annular band overlies a rearward portion of said one annular band, said second annular band being maintained in permanent tension.

9. The article as defined in claim 8 wherein said second annular band is positioned substantially at the area of maximum cross sectional dimensions of said flange.

10. The article as defined in claim 8 wherein said one annular band is comprised of two individual U-shaped half-sections arranged in circumferential telescoping relation around said flange.

11. The method of reinforcing a glass article of the type having a panel portion and an annular flange portion depending therefrom comprising the steps of positioning at least one annular band of substantially planar transverse cross-section of high tensile strength material around said annular flange portion with the leading annular edge of said band disposed in spaced-apart aligned relation to the non-viewing periphery of said panel portion and said trailing annular edge snugly engaging said annular flange at a point removed from said panel periphery, said annular band in the area of said leading annular edge being radially spaced from said flange and cooperating therewith to define an annular gap.

12. The method of reinforcing a glass article of the type having a panel portion and an annular flange portion depending therefrom comprising the steps of positioning at least one annular band of substantially planar transverse cross-section of high tensile strength material around said annular flange with the leading annular edge of said band disposed in the vicinity of and parallel to the non-viewing juncture of said panel portion and said annular flange portion, and the trailing annular edge of said band snugly engaging said annular flange in surface-to-surface engagement at an annular region removed from said juncture, said annular band in the area of said leading annular edge being radially spaced from said flange and cooperating therewith to define an annular gap, thereafter introducing an annular layer of bonding material into said gap, and reacting said annular layer of bonding material in situ to bond the opposing surfaces of said annular band and flange into an integral structure.

13. An essentially all-glass cathode-ray tube envelope resistant to fracture comprising a substantially funnel-shaped hollow body portion having a viewing portion enclosing its larger forward end and a neck tubulation projecting from its smaller rearward end, and reinforcing means exteriorly surrounding the peripheral sidewall region of said viewing portion having sufficient yield strength to prevent fracture propagation through the sidewall therebeneath on breakage, said reinforcing means including a first band of substantially planar transverse cross-section having its forwardmost leading edge disposed in spaced-apart aligned relation to the non-viewing peripheral contour of said viewing portion and its trailing edge extending rearwardly therefrom, said band in the area of said leading edge being spaced from said sidewall and cooperating therewith to define an annular gap and in the area of said trailing annular edge being complementally contoured to reside in interfacial contact with the exterior surface of said sidewall, and a second annular band overlying a rearward portion of said first band and means for maintaining said second band in permanent tension.

14. The article as defined in claim 13 wherein said first band is multipiece.

15. The article as defined in claim 13 wherein said first band is comprised of two individual U-shaped half-sections arranged in circumferential telescoping relation around said sidewall region.

16. The article as defined in claim 13 wherein said second annular band is positioned substantially at the area of maximum cross-sectional dimensions of said sidewall.

References Cited

UNITED STATES PATENTS

| | | | |
|---|---|---|---|
| 2,785,820 | 3/1957 | Vincent et al. | 220—2.1 |
| 3,260,397 | 7/1966 | De Gier et al. | 220—2.1 |

THERON E. CONDON, *Primary Examiner.*

MARTHA L. RICE, *Assistant Examiner.*